(12) United States Patent
Turkan et al.

(10) Patent No.: US 9,984,442 B2
(45) Date of Patent: May 29, 2018

(54) METHOD AND DEVICE FOR ENHANCING QUALITY OF AN IMAGE

(71) Applicant: THOMSON LICENSING, Issy les Moulineaux (FR)

(72) Inventors: Mehmet Turkan, Rennes (FR); Dominique Thoreau, Cesson Sevigne (FR); Philippe Guillotel, Vern sur Seiche (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days. days.

(21) Appl. No.: 15/115,655

(22) PCT Filed: Jan. 15, 2015

(86) PCT No.: PCT/EP2015/050664
§ 371 (c)(1),
(2) Date: Jul. 29, 2016

(87) PCT Pub. No.: WO2015/113826
PCT Pub. Date: Aug. 6, 2015

(65) Prior Publication Data
US 2017/0169545 A1  Jun. 15, 2017

(30) Foreign Application Priority Data

Jan. 30, 2014  (EP) .................................... 14305135
Jan. 30, 2014  (EP) .................................... 14305136

(51) Int. Cl.
*G06K 9/40* (2006.01)
*G06K 9/32* (2006.01)
(Continued)

(52) U.S. Cl.
CPC .............. *G06T 3/4076* (2013.01); *G06T 5/20* (2013.01); *G06T 5/50* (2013.01)

(58) Field of Classification Search
USPC ......................................... 382/274, 264, 299
See application file for complete search history.

(56) References Cited

U.S. PATENT DOCUMENTS 7,218,796 B2   5/2007  Bishop et al.
8,571,328 B2 * 10/2013  Shechtman .......... G06K 9/6211
                                                          382/218

(Continued)

FOREIGN PATENT DOCUMENTS

CN        102360498       9/2013
WO    WO2011092696       8/2011
WO    WO2013131851       9/2013

OTHER PUBLICATIONS

He et al., "Image Super-resolution through Pyramid Learning", 4th International Conference on Digital Home, Guangzhou, China, Nov. 23, 2012, pp. 241-245.

(Continued)

*Primary Examiner* — Kathleen Y Dulaney
(74) *Attorney, Agent, or Firm* — Meagher Emanuel Laks Goldberg & Liao, LLP (57) ABSTRACT

A method for enhancing quality of an image comprises deriving from an initial low-resolution image (LRI) an initial high-resolution image (IHRI) by upsampling (S2, S3), providing (S4), based on the initial low-resolution image (LRI), at least one downsampled filtered image ($AI_{ij}$, $AI_{i'j'}$) with lower resolution, providing (S6), based on the initial low-resolution image (LRI), an unfiltered image (LRI, $UI_{i'j'}$) having same resolution as the downsampled filtered image, selecting a patch (PI) from the initial high-resolution image (IHRI), finding (S8) filial patches (PA k) similar to the selected patch in the downsampled filtered image ($AI_{ij}$, $AI_{i'j'}$), finding, in the unfiltered image (LRI, $UI_{i'j'}$), parent patches ($PP_k$) locally associated to the filial patches ($PA_k$), and linearly combining (S14) the parent patches ($PP_k$) to (Continued)

form an enhanced quality patch (EP). Finally, enhanced quality patches (EP) obtained by repeatedly carrying out above steps are combined (S15) to form an enhanced quality high-resolution image ($EI_p$).

19 Claims, 3 Drawing Sheets

(51) Int. Cl.
    *G06T 3/40*    (2006.01)
    *G06T 5/50*    (2006.01)
    *G06T 5/20*    (2006.01)

(56) References Cited

U.S. PATENT DOCUMENTS

| | | | | |
|---|---|---|---|---|
| 8,917,948 | B2* | 12/2014 | Jin | G06T 3/4053 382/254 |
| 9,142,009 | B2* | 9/2015 | Lin | G06T 5/003 |
| 2006/0227152 | A1* | 10/2006 | Berenguer | G06T 3/4084 345/660 |
| 2012/0328210 | A1* | 12/2012 | Fattal | G06T 3/403 382/264 |
| 2013/0051519 | A1 | 2/2013 | Yang et al. | |
| 2013/0071041 | A1* | 3/2013 | Jin | G06T 3/4053 382/254 |
| 2013/0301933 | A1* | 11/2013 | Salvador | G06T 5/003 382/205 |
| 2015/0071545 | A1* | 3/2015 | Yang | G06K 9/46 382/190 |
| 2015/0093015 | A1* | 4/2015 | Liang | G06T 3/4076 382/154 |
| 2015/0104116 | A1* | 4/2015 | Salvador | G06T 3/4053 382/300 |
| 2015/0213579 | A1* | 7/2015 | Alacoque | G06T 3/4053 382/300 |
| 2015/0324953 | A1* | 11/2015 | Salvador Marcos | G06T 3/4053 382/300 |

OTHER PUBLICATIONS

Irani et al., "Improving Resolution by Image Registration", CVGIP, Graphical Models Image Process, vol. 53, No. 3, May 1991, pp. 231-239.
Irani et al., "Motion Analysis for Image Enhancement: Resolution, Occlusion, and Transparency", Journal of Visual Communication and Image Representation, vol. 4, No. 4, Dec. 1993, pp. 324-335.
Farsiu et al., "Fast and Robust Multiframe Super Resolution", IEEE Transactions on Image Processing, vol. 13, No. 10, Oct. 2004, pp. 1327-1344.
Ashikhmin et al., "Synthesizing Natural Textures", 2001 Symposium on Interactive 3D Graphics, Research Triangle Park, North Carolina, USA, Mar. 19, 2001, pp. 271-226.
Barreto et al., "Region-Based Super-Resolution for Compression," Journal of Multidimensional Systems and Signal Processing, vol. 18, No. 2-3, Sep. 2007, pp. 59-81.
Baudes et al., "A non-local algorithm for image denoising," IEEE Computer Society Conference on Computer Vision and Pattern Recognition, San Diego, California, USA, Jun. 20, 2005, pp. 60-65.
Chang et al., "Super-Resolution Through Neighbor Embedding", IEEE Computer Society Conference on Computer Vision and Pattern Recognition, Washington, D. C., USA, Jun. 27, 2004, pp. 275-282.
Cheung et al., "Video epitomes", International Journal of Computer Vision, vol. 76, No. 1, Jan. 2008, pp. 1-13.
Criminisi et al., "Region Filling and Object Removal by Examplar-Based Image Inpainting", IEEE Transactions on Image Processing, vol. 13, No. 9, Sep. 2004, pp. 1200-1212.

Efros et al., "Texture Synthesis by Non-parametric Sampling", IEEE International Conference on Computer Vision, Kerkyra, Corfu, Greece, Sep. 20, 1999, pp. 1033-1038.
Fattal, R., "Image Upsampling via Imposed Edges Statistics", ACM Transactions on Graphics, vol. 26, No. 3, Jul. 2007, pp. 1-8.
Freedman et al., "Image and Video Upscaling from Local Self-Examples", ACM Transactions on Graphics, vol. 30, No. 2, Apr. 2011, pp. 1-11.
Freeman et al., "Example-Based Super-Resolution", IEEE Computer Graphics and Applications, Mar./Apr. 2002, pp. 56-65.
Freeman et al., "Learning Low-Level Vision", International Journal of Computer Vision, vol. 40, No. 1, Oct. 2000, pp. 25-47.
Glasner et al., "Super-Resolution from a Single Image", IEEE 12th International Conference on Computer Vision, Kyoto, Japan, Sep. 27, 2009, pp. 349-356.
Hertzmann et al., "Image Analogies", ACM SIGGRAPH, Los Angeles, California, USA, Aug. 12, 2001, pp. 327-340.
Kim et al., "Example-based Learning for Single-Image Super-Resolution", Proceedings of Tsinghua-Korea Advanced Institute of Science and Technology Joint Workshop on Pattern Recognition, 2004, pp. 140-148.
Lin et al., "Fundamental Limits of Reconstruction-Based Super-resolution Algorithms under Local Translation", IEEE Transactions on Pattern Analysis and Machine Intelligence, vol. 26, No. 1, Jan. 2004, pp. 83-97.
Lu et al., "Image Super-Resolution via Double Sparsity Regularized Manifold Learning," IEEE Transactions Circuits on and Systems for Video Technology, vol. 23, No. 12, Dec. 2013, pp. 2022-2033.
Michaeli et al., "Nonparametric Blind Super-Resolution", 2013 IEEE International Conference on Computer Vision, Sydney, New South Wales, Australia, Dec. 1, 2013, pp. 945-952.
Molina et al., "Towards a new video compression scheme using superresolution", Proceedings of SPIE 6077, Visual Communication Image Processing, Jan. 2006, pp. 1-13.
Nguyen et al., "A Computationally Efficient Superresolution Image Recontruction Algorithm", IEEE Transactions on Image Processing, vol. 10, No. 4, Apr. 2001, pp. 573-583.
Park et al., "Super-Resolution Image Reconstruction: A Technical Overview", IEEE Signal Processing Magazine, May 2003, pp. 21-36.
Roweis et al., "Nonlinear Dimensionality Reduction by Locally Linear Embedding", Science, New Series, vol. 290, No. 5500, Dec. 22, 2000, pp. 2323-2326.
Rudin et al., "Nonlinear total variation based noise removal algorithms," Physica D: Nonlinear Phenomena, vol. 60, No. 14, 1992, pp. 259-268.
Salvador et al., "Robust Super-Resolution for Interactive Video Navigation", IEEE Second International Conference on Consumer Electronics, YiChang, Hubei, China, Apr. 21, 2012, pp. 333-334.
Sugimoto et al., "Inter Frame Coding with Template Matching Spatio-Temporal Prediction", 2004 International Conference on Image Processing, Singapore, Singapore, Oct. 24, 2004, pp. 465-468.
Turkan et al., "Optimized Neighbor Embeddings for Single-Image Super-Resolution", IEEE International Conference on Image Processing, Melbourne, Australia, Sep. 15, 2013, pp. 645-649.
Turkan et al., "Self-Content Super-Resolution for Ultra-HD Up-Sampling", 13th European Conference on Visual Media Production, London, England, United Kingdom, Dec. 12, 2012, pp. 49-58.
Wei et al., "Fast Texture Synthesis using Tree-structured Vector Quantization", ACM SIGGRAPH, Louisiana, New Orleans, USA, Jul. 23, 2000, pp. 479-488.
Xiong et al., "Robust Web Image/Video Super-Resolution", IEEE Transactions on Image Processing, vol. 19, No. 8, Aug. 2010, pp. 2017-2028.
Yang et al., "Image Super-Resolution Via Sparse Representation", IEEE Transactions on Image Processing, vol. 19, No. 11, Nov. 2010, pp. 2861-2873.

* cited by examiner

METHOD AND DEVICE FOR ENHANCING QUALITY OF AN IMAGE

This application claims the benefit, under 35 U.S.C. § 365 of International Application PCT/EP2015/050664, filed Jan. 15, 2015, which was published in accordance with PCT Article 21 (2) on Aug. 6, 2015, in English, and which claims the benefit of European patent application No. 14305135.7, filed Jan. 30, 2014 and European patent application No. 14305136.5, filed Jan. 30, 2014.

FIELD

The present invention relates to a technique for enhancing the quality of an image, in particular for recovering missing high-frequency details in a given low-resolution (LR) image. Such techniques have a considerable commercial interest since they allow storing image information in a reduced storage space, and they decrease the bandwidth needed for processing and/or transmitting image information.

BACKGROUND

There is a physical limit to the degree of detail a picture can have, since its highest spatial frequency component cannot be higher than half the number of pixels per unit length of the image. Below this limit, the degree of detail of an image can vary depending on the subject matter shown, on the quality of processing etc. In the following description, we will distinguish between these two aspects by using the term "resolution" in connection with the above physical upper limit, and "image quality" in connection with the amount of detail perceived by a viewer in a specific image.

Conventional image quality enhancement techniques, described e.g. in documents [1]-[3] listed in the appendix to this application, rely on the fact that in video data, the content of subsequent images is partly repetitive, and that high-frequency information which is missing in a given image can be retrieved from previous or subsequent images, provided there are enough of these. The quality of the reconstructed high-resolution (HR) image therefore depends highly on the amount of data available in the LR images. However, in practice, insufficient number of LR observations, motion estimation (registration) errors, and unknown point spread function (PSF) limit the applicability of these multi-image SR methods to small up-scaling ratios with less than 2 under general conditions.

SUMMARY

The object of the present invention is to provide a method and a device by which the quality of individual images can be enhanced, without having recourse to previous or subsequent images in an image sequence.

The object is achieved, on the one hand, by a method, comprising the steps of
a) deriving, from an initial low-resolution image, an initial high-resolution image by upsampling;
b) providing, based on the initial low-resolution image, at least one downsampled filtered image as an auxiliary image having a resolution less than that of the initial high-resolution image;
c) providing, based on the initial low-resolution image, an unfiltered image having the same resolution as said at least one downsampled filtered image;
d) selecting a patch from said initial high-resolution image;
e) finding two or more filial patches (or child patches) similar to said selected patch in said at least one downsampled filtered image;
f) finding, in said unfiltered image, parent patches locally associated to said filial patches;
g) linearly combining the parent patches in order to form an enhanced quality patch; and
h) combining enhanced quality patches obtained by repeatedly carrying out steps d) to f) to form an enhanced quality high-resolution image.

The invention is based on the idea that although two different parent patches will usually not show the same object (or identical portions of an object), they may be similar enough to allow details to be reconstructed by combining a plurality of judiciously chosen parent patches. In other words, if what is shown in an image is a boundary between two differently colored regions, e.g. a white one and a black one, this boundary will be represented in the image by pixels in different shades of gray, the shade depending on where inside the pixel the boundary actually is, if the pixel tends more to the white or the black side. The position of the boundary inside the pixel can be judged more accurately based on patches showing other regions of the boundary where the gray shades of the border pixels are different because the boundary is located differently with respect to these pixels.

If a first one of said at least one auxiliary images has the same resolution as the initial low-resolution image, the unfiltered image associated to said first auxiliary image may be the initial low-resolution image itself.

In an embodiment that appears often in practice, there will usually be more than one auxiliary image formed from a same initial low-resolution image, in which case a second one of said auxiliary images may have a resolution which is less than the resolution of the initial low-resolution image, and a second unfiltered image associated to said second auxiliary image is obtained by downsampling the initial low-resolution image to the resolution of the second auxiliary image.

In an embodiment, each auxiliary image is obtained by downsampling the initial high-resolution image.

Upsampling may simply comprise inserting a predetermined number of pixels between two adjacent pixels of the initial low-resolution image, and assigning these a standard value, e.g. 0, or the value of one of the adjacent pixels. In that case a low-pass filtering step ensures that if auxiliary images are obtained by downsampling to the resolution of the initial low-resolution image, these auxiliary images can be different from the original low-resolution image and from each other.

The low-pass filtering may be carried out by dampening high frequency components in the spatial spectrum of the upsampled image, or by interpolating.

In one embodiment, in step e) a degree of similarity to the selected patch is evaluated for every patch in said at least one auxiliary image, and only a predetermined number of patches having the highest degree of similarity are retained as said filial patches.

The similarity of two patches may be defined in various ways. A convenient one is to use the cross correlation of two patches as a measure of their similarity.

In step g) the enhanced quality patch is in one embodiment obtained by the sub-steps of
g1) forming a linear combination of said filial patches by assigning to each filial patch a linear coefficient such that the similarity of the linear combination to the selected patch is better than that of the most similar single filial patch, and g2) forming the linear combination of the parent patches using the linear coefficients assigned to their respective filial patches.

In step g1) the linear coefficients may be determined by iteratively selecting one of said filial patches, forming a linear combination of a hypothetical patch and said selected filial patch and replacing the hypothetical patch by the linear combination of the hypothetical patch and the filial patch if the similarity of the superposition is better than that of the hypothetical patch.

In the first iteration, the hypothetical patch might be chosen arbitrarily; preferably, one of the filial patches is selected as the hypothetical patch.

In the linear combination of step g1), linear coefficients of the hypothetical patch and of the filial patch are set so as to optimize the similarity of their linear combination to the selected patch.

If the similarity of the linear combination of filial patches is not better than that of the hypothetical patch, it can be assumed that an optimum has been found, and the iteration can be broken off (ie. terminated). The linear coefficients of the hypothetical patch or of said linear combination of filial patches can be taken as the linear coefficients of the parent patches in step g) then.

Alternatively, a first provisional enhanced quality patch can be formed by linearly combining the parent patches using the linear coefficients of the hypothetical patch, and a second provisional enhanced quality patch can be formed by linearly combining the parent patches using the linear coefficients of the linear combination of said hypothetical patch and said selected filial patch. The iteration is broken off (ie. terminated) if the similarity of the second provisional enhanced quality patch and the patch selected in step d) is not better than the similarity of the first provisional enhanced quality patch and the patch selected in step d).

In order to minimize the number of iterations, in step g1) the filial patches should be selected in the order of decreasing similarity.

The image quality may be improved further if steps b) to h) are repeated using the enhanced quality high-resolution image obtained in a previous execution of step h) as the initial high-resolution image in subsequent step b).

The number of repetitions of steps b) to h) should preferably be between 3 and 5, since with a larger number of repetitions, no more substantial improvements of the enhanced quality high-resolution image are achieved.

Further features and advantages of the invention will become apparent from the subsequent description of embodiments thereof referring to the appended drawings.

DETAILED DESCRIPTION OF EMBODIMENTS

Figure 1:
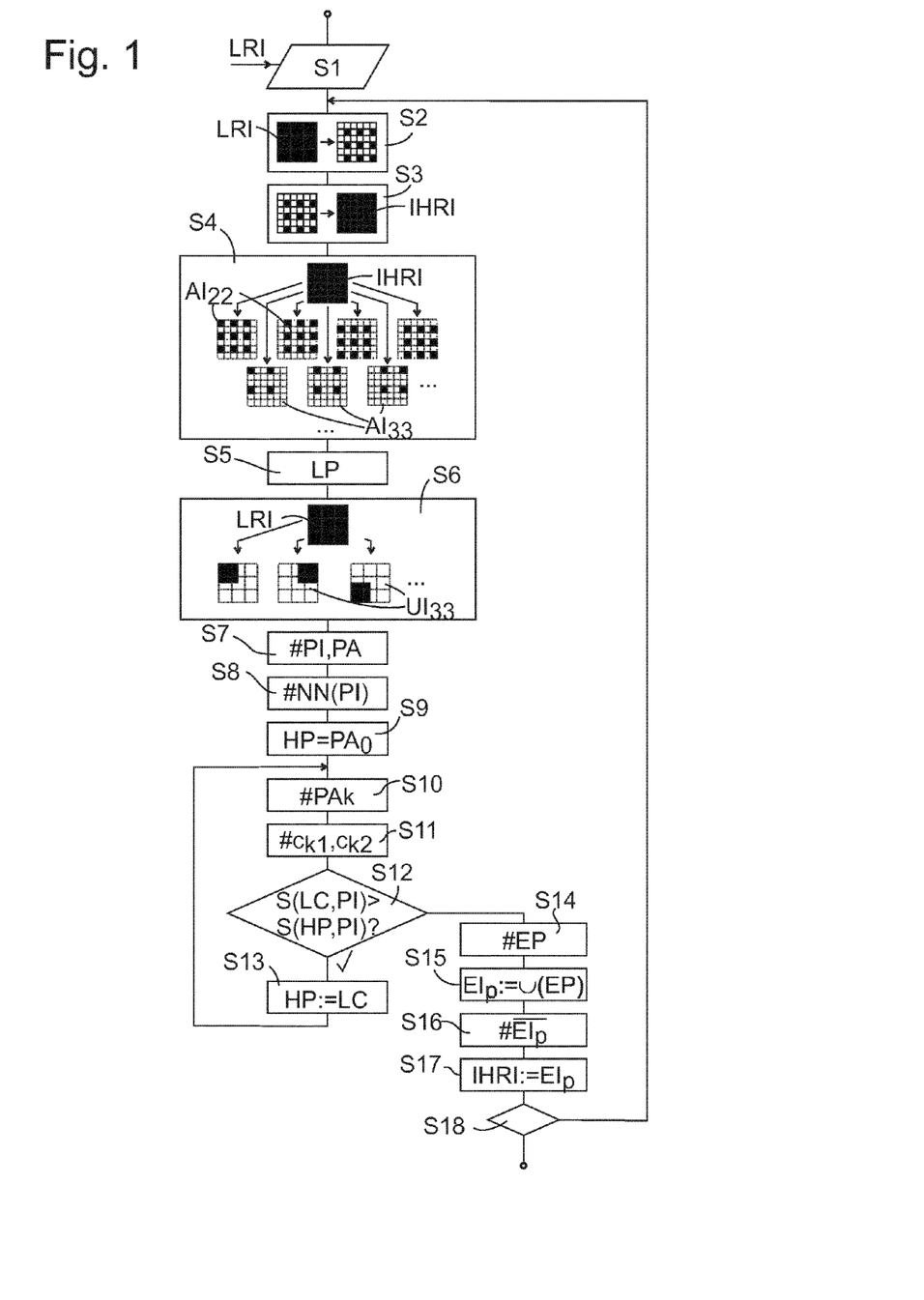
FIG. 1 is a flowchart of the method of the invention.

The method of forming an enhanced quality high-resolution image from an initial low-resolution image subsequently described referring to FIG. 1 is preferably executed on a microprocessor, or in a microprocessor system having a large number of parallel processors.

In step S1 the system receives an initial low-resolution image LRI formed of e.g. n rows and m columns of pixels. For the sake of simplicity, it will be assumed here that the image LRI is in black and white only, each pixel corresponding to one integer number specifying its shade. The generalization to a color image is straightforward for a skilled person.

In step S2, the image LRI is upsampled by factors i, j, by inserting (i−1) additional rows between any two adjacent rows of LRI, and by inserting (j−1) additional columns between any two adjacent columns of LRI, yielding an image of i*n rows by j*m columns. i and j are small integers, at least one of which is larger than 1; in most practical embodiments, i=j holds.

The inserted pixels have data assigned to them by spatially low-pass filtering the image obtained in S2, or by bilinear or bicubic interpolation. In this way an initial high-resolution image IHRI is obtained in S3. It should be kept in mind that although the physical resolution of this image is considerably higher than that of initial low-resolution image LRI, the degree of detail is not better and possibly even less than that of LRI.

In step S4, auxiliary images $AI_{ij}$ are derived by downsampling initial high-resolution image IHRI by factors i, j. The resolution of such an auxiliary image $AI_{ij}$ is the same as that of initial low-resolution image LRI, and i*j different auxiliary images $AI_{ij}$ can be derived. In FIG. 1, i=j=2, so that there are four different auxiliary images $AI_{22}$. If the initial high-resolution image IHRI was obtained by interpolation, so that the pixel data of the original pixels from initial low-resolution image LRI remain unchanged, one of these i*j auxiliary images may be identical to LRI.

Further auxiliary images $AI_{i'j'}$ may be generated whose downsampling factors i', j' are larger than i, j. For instance, in FIG. 1, I'=j'=3. These auxiliary images $AI_{i'j'}$ can be obtained by directly downsampling IHRI, or by downsampling auxiliary images $AI_{ij}$ by factors i'/i, j'/j, respectively. It should be noted that the downsampling factors i', j' and i'/i, j'/j do not have to be integers; in particular, i'/i, j'/j preferably are rational numbers between 1 and 2. Downsampling by a non-integer rational factor i'=r/m can be carried out by first interpolating by integer factor m and then downsampling by integer factor r.

The number of different auxiliary images $AI_{ij}$ that can be derived from IHRI is i*j. Therefore, if the downsampling factors are high, in particular in case of factors i', j', it may be sufficient to generate only a subset of these auxiliary images.

In order to avoid aliasing effects, the auxiliary images $AI_{ij}$, $AI_{i'j'}$ are subjected to spatial low pass filtering in step S5.

All those auxiliary images $AI_{ij}$, $AI_{i'j'}$ may be obtained simultaneously by assigning the generation of each auxiliary image to a different processor or set of processors of the microprocessor system.

For each auxiliary image $AI_{i'j'}$ an unfiltered downsampled image $UI_{i'j'}$ having the same resolution is obtained by downsampling initial low-resolution image LRI by factors i'/i, j'/j in step S6.

In step S7, patches PI, PA are defined in initial high-resolution image IHRI and in the auxiliary images $AI_{ij}$, $AI_{i'j'}$. In practice, the patches PI, PA should be rectangles comprising a small number of rows and columns, e.g. 6 by 6, the number being the same for patches of the initial high-resolution image IHRI and of the auxiliary images $AI_{ij}$, $AI_{i'j'}$, regardless of their respective downsampling factors.

Each pixel of IHRI belongs to at least one patch PI. The patches PI may, and preferably do, overlap with each other.

In step S8 a nearest neighbor search is carried out for every patch PI, i.e. for all patches PA of the auxiliary images AIij, AIi'j' the degree of similarity to patch PI is evaluated. For each patch PI, a set NN(PI) is retained which comprises those K patches PA whose similarity to the given patch PI is highest.

From a mathematical point of view the patches PI, PA can be regarded as vectors. In the case considered here, these vectors have 6*6=36 components $pi_{i,j}$, $pa_{i,j}$, and their vector space has 36 dimensions.

Similarity S of two patches may e.g. be evaluated as a normalized scalar product of such vectors:

$$S(PI, PA) = \frac{\sum_{i,j=1}^{6} pi_{i,j} pa_{i,j}}{|pi||pa|} \quad (1)$$

S can take on values between 0 and 1. The patches retained in step S8 are those whose S is closest to 1. Since processing of each input image LRI involves calculating a huge number of similarities S, processing time may be shortened by distributing these calculations among the processors of the microprocessor system.

Figure 2:
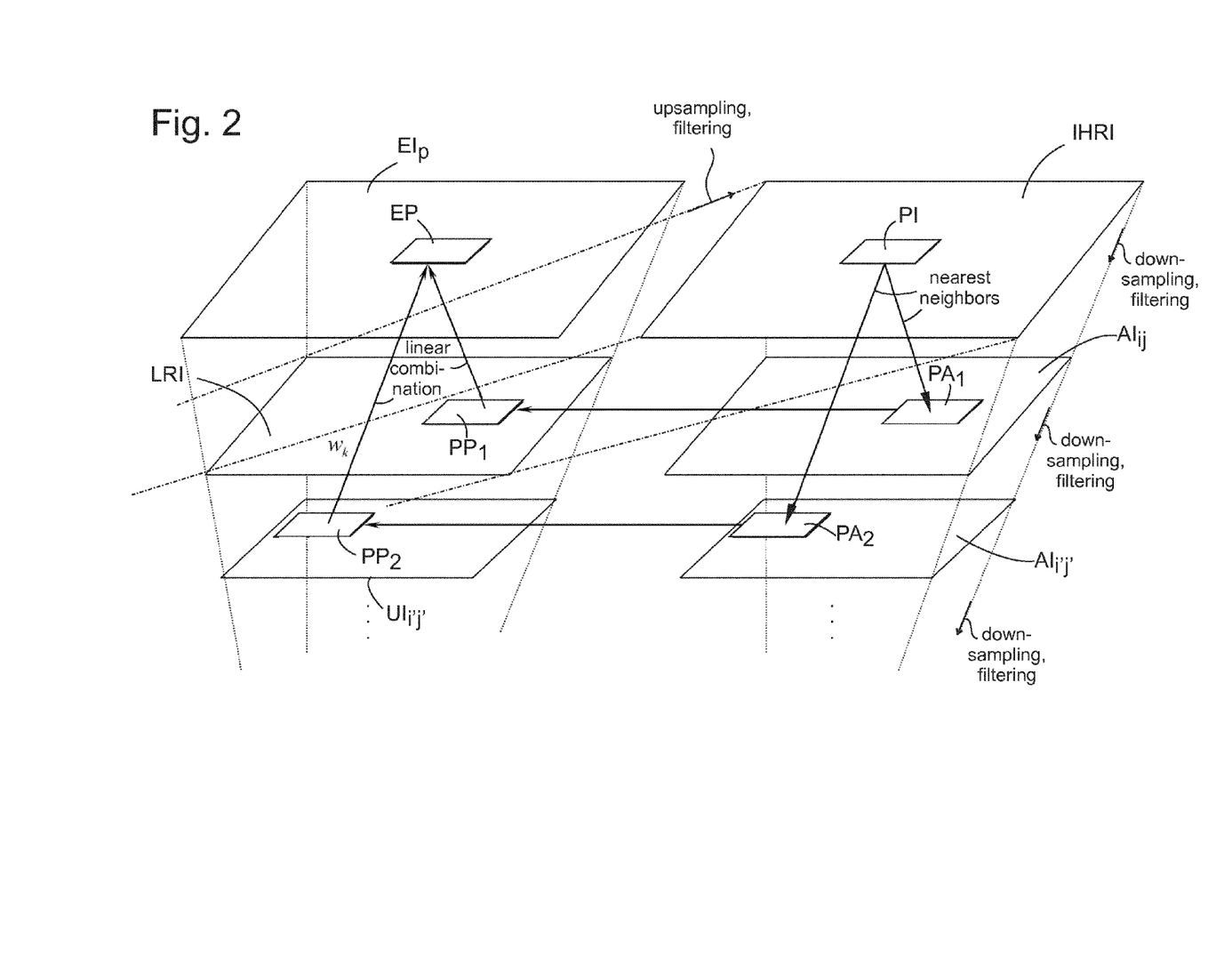
FIG. 2 illustrates a relationship between various images used in the method of claim 1.

Each patch PA in one of those auxiliary images $AI_{ij}$ that have the same resolution as original input image LRI is associated to a patch PP in original input image LRI depicting the same matter (cf. patches $PA_1$, $PP_1$ in FIG. 2), and from which it can be said to be derived by the successive up- and downsampling operations described above. Therefore patch PP is referred to herein as parent patch, and patch PA as its filial patch. In analogy, patches depicting the same matter in auxiliary image $AI_{i'j'}$ and in unfiltered downsampled image Ui'j' having the same resolution (ie. patches $PA_2$, $PP_2$ in FIG. 2) are referred to as filial and parent patches, too.

It is assumed that the patches $PA_0$ to $PA_{(K-1)}$ in NN(PI) are ordered by decreasing similarity to PI, i.e.

$S(PA_0, PI) \geq S(PA_1, PI) \geq \ldots \geq S(PA_{(K-1)}, PI)$.

In step S9, filial patch $PA_0$ having the highest similarity S to patch PI is selected from the set NN(PI) as a hypothetical patch HP.

A filial patch $PA_k$ having the next highest similarity S to patch PI, in this instance $PA_1$, is selected in step S10. In step S11, linear coefficients $c_{k1}$, $c_{k2}$ of a linear combination $LC = c_{k1} HP + c_{k2} PA_k$, (2)

(in this case k=1) are chosen so that on the one hand a normalization condition such as $c_{k1} + c_{k2} = 1$ is fulfilled and that on the other hand the similarity S(LC,PI) of LC and PI becomes maximum. Step S12 checks whether this similarity S(LC, PI) is better than the similarity S(HP, PI) between PI and the hypothetical patch HP, and if yes, the linear combination LC replaces the hypothetical patch HP in step S13, and the process returns to step S10, now selecting the most similar one among the remaining patches of NN(PI), that is PA2. In step S10, linear coefficients $c_{k1}$, $c_{k2}$ of a linear combination $LC = c_{21} HP + c_{22} PA_2$, i.e. k equaling 2, are chosen so that the normalization condition is fulfilled and that If the patches PA, PI are regarded as vectors, their vector space has 36 dimensions, and PI can be regarded as a linear combination of 36 basis vectors. Therefore, if the number K of patches $PA_k$ in NN(PI) is considerably larger than the number of pixels in the patches (i.e. the dimension of the patch vectors), many of these patches $PA_k$ will be redundant and will not improve the final outcome of the procedure. Therefore the number K of patches in NN(PI) can be limited to some value between 0.5 times and 2 times the number of pixels in the patches.

Obviously, steps S10, S11 can be re-iterated as long as not all K patches of NN(PI) have been processed. In practice, breaking off (ie. terminating) the iteration earlier not only saves processing time; if the breaking off condition is judiciously chosen, this may also improve the quality of the final HR image.

According to a first embodiment, the iteration is broken off in S12 as soon as the similarity S(LC,PI) is not better than S(HP,PI) (which is equivalent to optimal similarity being found for $c_{k2} = 0$ in S11).

At that stage, all of the patches $PA_0$ to $PA_{k-1}$ from NN(PI) that contribute to HP and their respective linear coefficients are known. If it is assumed that the iteration breaks off at k=3, HP is $HP = c_{21}(c_{11} PA_0 + c_{12} PA_1) + c_{22} PA_2$. (3)

Generally, $$HP = \prod_{i=1}^{k-1} c_{i1} PA_0 + c_{12} \prod_{i=2}^{k-1} c_{i1} PA_1 + c_{22} \prod_{i=3}^{k-1} c_{i1} PA_2 + \ldots + c_{(k-1)2} PA_{k-1}. \quad (4)$$

When the iteration is broken off, the method branches to S14, where an enhanced patch EP is obtained by replacing in eq. (4) the filial patches by their respective parent patches PP:

$$EP = \prod_{i=1}^{k-1} c_{i1} PP_0 + c_{12} \prod_{i=2}^{k-1} c_{i1} PP_1 + c_{22} \prod_{i=3}^{k-1} c_{i1} PP_2 + \ldots + c_{(k-1)2} PP_{k-1}. \quad (5)$$

According to a second embodiment, an enhanced patch $EP_k$ is calculated using eq. (5) in step S11 already, based on the optimized linear combination $LC = c_{k1} HP + c_{k2} PA_k$ obtained in this same step. The similarity of this patch $EP_k$ to a patch LP depicting the same matter in initial low-resolution image LRI is calculated. Patch $EP_k$ and the patch LP in image LRI do not have the same number of pixels, therefore, if the similarity between both is calculated by a normalized scalar product as in eq. (1), patch $EP_k$ will first have to be downsampled so that both patches EP, LP have the same resolution. Here, step S12 judges whether the similarity between LP and $EP_k$ obtained in iteration k of steps S10, S11 is better than the similarity obtained in previous iteration (k-1). If it isn't, the iteration breaks off, and the enhanced patch EP output in step S14 is $EP_{k-1}$.

Steps S10-S14 are carried out for all patches PI of initial high-resolution image IHRI, either in a loop or simultaneously, distributed among the multiple processors. Combining all enhanced patches EP in step S15 thus yields a complete enhanced quality image $EI_1$. Where enhanced patches EP overlap, they are averaged in S16 in order to ensure smooth transitions between patches in the enhanced quality image $EI_1$.

The method can end with image $EI_1$ being output. According to a preferred embodiment, however, initial high-resolution image IHRI is overwritten by image EI1 in S17, and the procedure returns to step S4, so that a second enhanced quality image $EI_2$ is obtained in S16.

Steps S4 to S16 may be re-iterated one or more times, each time overwriting in step S4 image $EI_{p-1}$, p=2, 3, . . . by image $EI_p$ obtained in previous step S16 until in step S18 either some predetermined value of p, such as 3, 4 or 5 is reached or until the similarity of images $EI_{p-1}$, $EI_p$ is so high that no further substantial improvement is to be expected.

Figure 3:
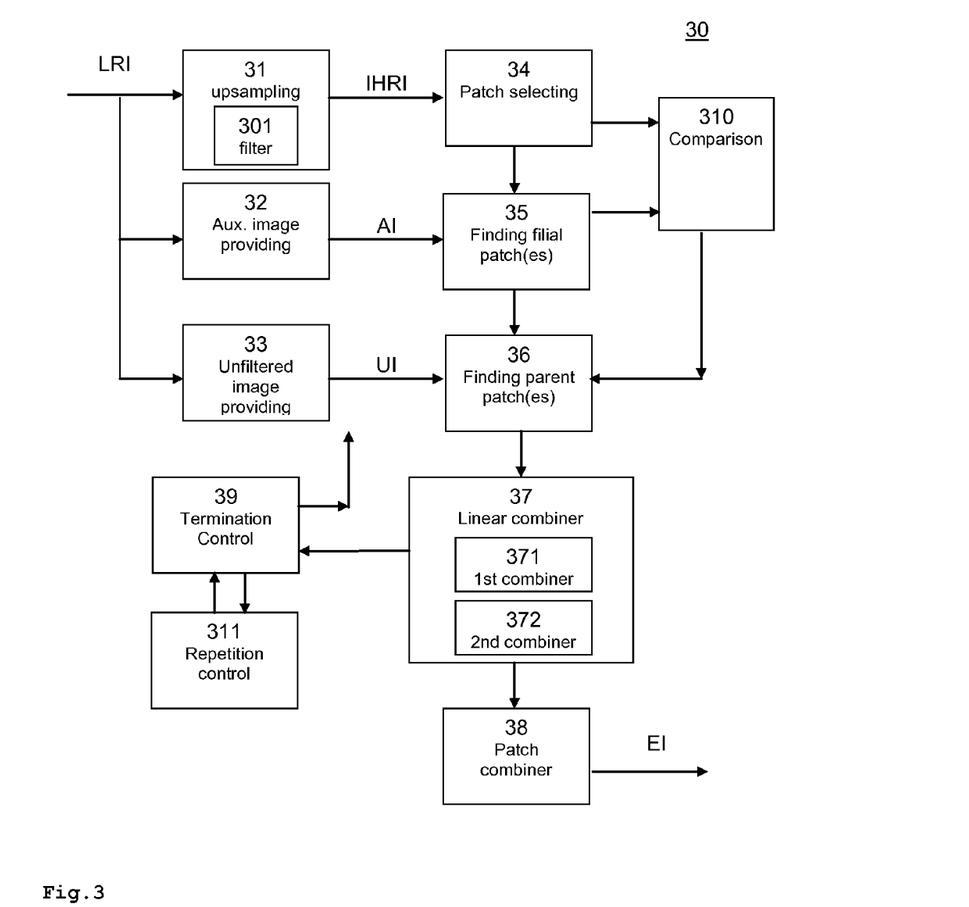
FIG. 3 is a block diagram of a device of claim 15.

Turning to FIG. 3, in one embodiment, a device 30 for enhancing quality of an image comprises
a) upsampling means 31 for deriving, from an initial low-resolution image, an initial high-resolution image IHRI by upsampling;
b) means 32 for providing, based on the initial low-resolution image, at least one auxiliary image AI having a resolution that is less than that of the initial high-resolution image IHRI;
c) means 33 for providing, based on the initial low-resolution image, an unfiltered image UI having the same resolution as said at least one auxiliary image;
d) means 34 for selecting a patch from said initial high-resolution image;
e) means 35 for finding filial patches similar to said selected patch in said at least one auxiliary image;
f) means 36 for finding, in said unfiltered image, parent patches locally associated to said filial patches
g) means 37 for linearly combining the parent patches in order to form an enhanced quality patch; and
h) means 38 for combining a plurality of enhanced quality patches obtained by said means d) to f) to form an enhanced quality high-resolution image.

In one embodiment of the device, the at least one auxiliary image is obtained by downsampling the initial high-resolution image.

In one embodiment of the device, a first one of said at least one auxiliary images has the same resolution as the initial low-resolution image, and the unfiltered image associated to said first downsampled filtered image is the initial low-resolution image.

In one embodiment of the device, a second one of said auxiliary images has a resolution which is less than the resolution of the initial low-resolution image, and a second unfiltered image is obtained by downsampling means for downsampling the initial low-resolution image to the resolution of the second auxiliary image.

In one embodiment of the device, the means 31 for deriving the initial high-resolution image further comprises a low-pass filter 301, in particular an interpolation filter.

In one embodiment, the device 30 further comprises comparison means 310 adapted for evaluating a degree of similarity to the selected patch for every patch in said at least one auxiliary image, and for retaining a predetermined number K of patches having the highest degree of similarity as said filial patches.

In one embodiment of the device, the means 37 for linearly combining the parent patches comprises
g1) first combiner means 371 adapted for forming a linear combination of said filial patches by assigning to each filial patch a linear coefficient such that the similarity of the linear combination to the selected patch is better than that of the most similar single filial patch, and
g2) second combiner means 372 adapted for forming the linear combination of the parent patches using the linear coefficients assigned to their respective filial patches.

In one embodiment, the first combiner means 371 is further adapted for determining the linear coefficients by iteratively selecting one of said filial patches, forming a linear combination of a hypothetical patch and said selected filial patch and replacing the hypothetical patch by the linear combination of the hypothetical patch and the filial patch if the similarity of the superposition is better than that of the hypothetical patch.

In one embodiment of the device, linear coefficients of the hypothetical patch and of the filial patch are set so as to optimize the similarity of their linear combination.

In one embodiment, the device further comprises termination control means 39 adapted for breaking off the iteration if the similarity of the linear combination of filial patches is not better than that of the hypothetical patch.

In one embodiment of the device, the hypothetical patch is a linear combination of filial patches, and a first provisional enhanced quality patch is formed by linearly combining the parent patches using the linear coefficients of the hypothetical patch, and a second provisional enhanced quality patch is formed by linearly combining the parent patches using the linear coefficients of the linear combination of said hypothetical patch and said selected filial patch, and the termination control means 39 breaks off the iteration if the similarity of the second provisional enhanced quality patch and the patch selected in means d) is not better than the similarity of the first provisional enhanced quality patch and the patch selected in means d).

In one embodiment of the device, means g1) is adapted for selecting the filial patches in the order of decreasing similarity.

In one embodiment of the device, further comprising repetition control means 311 adapted for controlling repeated operation cycles of means b) to h), wherein the enhanced quality high-resolution image obtained in an operation cycle from means h) is used as the initial high-resolution image in subsequent operation cycle of means b).

In one embodiment of the device, the repetition control means 311 controls the device to execute 3 to 5 operation cycles of means b) to h).

Each of the above-mentioned means may be implemented by one or more hardware processing elements or processors, wherein two or more of the above-mentioned means may be implemented by a single hardware processing element or processor.

In one embodiment, a computer program comprises software code enabling a computer to
a) derive, from an initial low-resolution image, an initial high-resolution image by upsampling,
b) provide, based on the initial low-resolution image, at least one auxiliary image the resolution of which is less than that of the initial high-resolution image,
c) provide, based on the initial low-resolution image, an unfiltered image having the same resolution as said at least one auxiliary image,
d) select a patch from said initial high-resolution image;
e) find filial patches similar to said selected patch in said at least one auxiliary image,
f) find, in said unfiltered image, parent patches locally associated to said filial patches,
g) linearly combine the parent patches in order to form an enhanced quality patch, and
h) combine enhanced quality patches obtained by repeatedly carrying out steps d) to f) to form an enhanced quality high-resolution image.

In various embodiments, the computer program comprises software code enabling a computer to execute further functions as described above.

It will be understood that the present invention has been described purely by way of example, and modifications of detail may be made and are implicitly incorporated. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

CITED REFERENCES

[1] Irani, M., Peleg, S.: Improving resolution by image registration. CVGIP: Graphical Models Image Process. 53 (1991) 231-239
[2] Irani, M., Peleg, S.: Motion analysis for image enhancement: Resolution, occlusion, and transparency. J. Vis. Comm. Image Repres. 4 (1993) 324-335
[3] Farsiu, S., Robinson, M., Elad, M., Milanfar, P.: Fast and robust multiframe superresolution. IEEE Trans. Image Process. 13 (2004) 1327-1344

REFERENCE SIGNS

LRI initial low-resolution image
IHRI initial high-resolution image
$AI_{ij}$,
$AI_{i'j'}$ auxiliary image
$UI_{i'j'}$ unfiltered downsampled image
PI patch in IHRI
PA, $PA_k$ filial patch in auxiliary image
PP, $PP_{k,?}$ parent patch in LRI or $UI_{i'j'}$
EP enhanced patch
EI enhanced image

The invention claimed is:

1. A method for enhancing quality of an image, comprising:
  a) deriving, from an initial low-resolution image, an initial high-resolution image by upsampling;
  b) providing, based on the initial high-resolution image at least one downsampled filtered image as an auxiliary image having a resolution less than that of the initial low resolution image;
  c) providing, based on the initial low-resolution image, an unfiltered image having the same resolution as said at least one downsampled filtered image;
  d) selecting a patch from said initial high-resolution image;
  e) finding two or more filial patches similar to said selected patch in said at least one downsampled filtered image;
  f) finding, in said unfiltered image, parent patches locally associated to said filial patches;
  g) linearly combining the parent patches in order to form an enhanced quality patch; and
  h) combining enhanced quality patches obtained by repeatedly carrying out d) to f) to form an enhanced quality high-resolution image.

2. The method of claim 1, wherein a first one of said at least one auxiliary images has the same resolution as the initial low-resolution image, and the unfiltered image associated to said first downsampled filtered image is the initial low-resolution image.

3. The method of claim 2, wherein a second one of said auxiliary images has a resolution which is less than the resolution of the initial low-resolution image, and a second unfiltered image is obtained by downsampling the initial low-resolution image to the resolution of the second auxiliary image.

4. The method of claim 1 wherein the deriving the initial high-resolution image further comprises low-pass filtering, in particular interpolating.

5. The method of claim 1 wherein in e) a degree of similarity to the selected patch is evaluated for every patch in said at least one auxiliary image, and a predetermined number of patches having the highest degree of similarity is retained as said filial patches.

6. The method of claim 5, wherein g) comprises:
  g1) forming a linear combination of said filial patches by assigning to each filial patch a linear coefficient such that similarity of the linear combination of said filial patches to the selected patch is better than that of the most similar single filial patch, and
  g2) forming the linear combination of the parent patches using the linear coefficients assigned respectively to said filial patches.

7. The method of claim 6, wherein in g1) the linear coefficients are determined by, in iteration, selecting one of said filial patches, forming a linear combination of a hypothetical patch and said selected filial patch and replacing the hypothetical patch by the linear combination of the hypothetical patch and the filial patch if similarity of a superposition is better than that of the hypothetical patch.

8. The method of claim 7, wherein linear coefficients of the hypothetical patch and of the filial patch are set so as to optimize similarity of the linear combination of the hypothetical patch and the filial patch.

9. The method of claim 7, wherein the iteration is broken off if the similarity of the linear combination of filial patches is not better than that of the hypothetical patch.

10. The method of claim 7, wherein, the hypothetical patch being a linear combination of filial patches, a first provisional enhanced quality patch is formed by linearly combining the parent patches using the linear coefficients of the hypothetical patch, and a second provisional enhanced quality patch is formed by linearly combining the parent patches using the linear coefficients of the linear combination of said hypothetical patch and said selected filial patch, and the iteration is broken off if similarity of the second provisional enhanced quality patch and the patch selected in d) is not better than similarity of the first provisional enhanced quality patch and the patch selected in d).

11. The method of claim 7, wherein in g1) the filial patches are selected in the order of decreasing similarity.

12. The method of claim 1, wherein b) to h) are repeated using the enhanced quality high-resolution image obtained in a previous execution of h) as the initial high-resolution image in subsequent b).

13. The method of claim 12 wherein b) to h) are repeated 3 to 5 times.

14. A device for enhancing quality of an image, comprising at least one processor and at least a computer storage device, wherein the at least one processor is configured to:
  a) derive, from an initial low-resolution image, an initial high-resolution image by upsampling;
  b) provide, based on the initial high-resolution image, at least one auxiliary image the resolution of which is less than that of the initial low resolution image;
  c) provide, based on the initial low-resolution image, an unfiltered image having the same resolution as said at least one auxiliary image;
  d) select a patch from said initial high-resolution image;

e) find filial patches similar to said selected patch in said at least one auxiliary image;
f) find, in said unfiltered image, parent patches locally associated to said filial patches
g) linearly combine the parent patches in order to form an enhanced quality patch; and
h) combine a plurality of enhanced quality patches obtained by said d) to f) to form an enhanced quality high-resolution image.

15. A non-transitory computer readable medium storing a computer program causing a processor to execute a method for enhancing quality of an image, said method comprising:
  a) deriving from an initial low-resolution image, an initial high-resolution image by upsampling;
  b) providing, based on the initial high resolution image, at least one auxiliary image the resolution of which is less than that of the initial low-resolution image;
  c) providing, based on the initial low-resolution image, an unfiltered image having the same resolution as said at least one auxiliary image;
  d) selecting a patch from said initial high-resolution image;
  e) finding filial patches similar to said selected patch in said at least one auxiliary image;
  f) finding, in said unfiltered image, parent patches locally associated to said filial patches
  g) linearly combining the parent patches in order to form an enhanced quality patch; and
  h) combining enhanced quality patches obtained by repeatedly carrying out d) to f) to form an enhanced quality high-resolution image.

16. The device of claim 14, wherein the at least one processor is further configured to evaluate a degree of similarity to the selected patch is evaluated for every patch in said at least one auxiliary image, and for retaining a predetermined number K of patches having the highest degree of similarity as said filial patches.

17. The device of claim 14, wherein the at least one processor is further configured to:
  g1) form a linear combination of said filial patches by assigning to each filial patch a linear coefficient such that similarity of the linear combination of said filial patches to the selected patch is better than that of the most similar single filial patch, and
  g2) form the linear combination of the parent patches using the linear coefficients assigned respectively to said respective filial patches.

18. The device of claim 14, wherein the at least one processor is further configured to control repeated operation cycles of b) to h), wherein the enhanced quality high-resolution image obtained in an operation cycle from h) is used as the initial high-resolution image in subsequent operation cycle of b).

19. The device of claim 14, wherein the at least one processor derives the initial high-resolution image using a low-pass filter or an interpolation filter.

* * * * *